(12) United States Patent
Misawa (10) Patent No.: US 10,658,865 B2
(45) Date of Patent: May 19, 2020

(54) VEHICLE AND POWER TRANSFER SYSTEM

(71) Applicant: Toyota Jidosha Kabushiki Kaisha, Toyota-shi, Aichi-ken (JP)

(72) Inventor: Takahiro Misawa, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 17 days.

(21) Appl. No.: 16/020,442

(22) Filed: Jun. 27, 2018

(65) Prior Publication Data

US 2019/0006878 A1 Jan. 3, 2019

(30) Foreign Application Priority Data

Jul. 3, 2017 (JP) ................................ 2017-130122

(51) Int. Cl.
| | |
|---|---|
| *H02J 7/04* | (2006.01) |
| *H02J 50/12* | (2016.01) |
| *H02J 7/02* | (2016.01) |
| *B60L 53/12* | (2019.01) |
| *B60L 53/14* | (2019.01) |
| *B60L 53/66* | (2019.01) |

(52) U.S. Cl.
CPC .............. *H02J 7/045* (2013.01); *B60L 53/12* (2019.02); *B60L 53/14* (2019.02); *B60L 53/66* (2019.02); *H02J 7/025* (2013.01); *H02J 50/12* (2016.02); *B60L 2240/80* (2013.01)

(58) Field of Classification Search
CPC .. H02J 7/045; H02J 50/12; H02J 7/025; H02J 50/10; B60L 53/66; B60L 53/14; B60L 53/12; B60L 2240/80

USPC .......................................................... 320/162
See application file for complete search history.

(56) References Cited

U.S. PATENT DOCUMENTS

| | | | | |
|---|---|---|---|---|
| 5,633,577 A | * | 5/1997 | Matsumae | H02J 7/0013 322/37 |
| 7,741,734 B2 | * | 6/2010 | Joannopoulos | H01F 38/14 307/104 |
| 8,332,078 B2 | * | 12/2012 | Narel | B60L 53/305 700/297 |
| 8,655,524 B2 | * | 2/2014 | Ichikawa | B60K 6/48 701/22 |
| 10,199,855 B2 | * | 2/2019 | Yamauchi | H02J 50/10 |
| 10,399,460 B2 | * | 9/2019 | Yuasa | H02J 7/025 |
| 2007/0222542 A1 | | 9/2007 | Joannopoulos et al. | |

(Continued)

FOREIGN PATENT DOCUMENTS

| | | |
|---|---|---|
| AU | 2006269374 B2 | 10/2009 |
| AU | 2007349874 A2 | 1/2010 |

(Continued)

*Primary Examiner* — M Baye Diao
(74) *Attorney, Agent, or Firm* — Dinsmore & Shohl LLP (57) ABSTRACT

A vehicle ECU executes a control process including: a step of determining whether or not contact charging is being performed; a step of executing a first slow change process for requested power if it is determined that contact charging is being performed; a step of determining whether or not wireless charging is being performed if it is determined that contact charging is not being performed; and a step of sending a power transmitting device an instruction for execution of a second slow change process for transmission power if it is determined that wireless charging is being performed.

3 Claims, 7 Drawing Sheets

(56) References Cited

U.S. PATENT DOCUMENTS

| | | |
|---|---|---|
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2013/0127409 A1* | 5/2013 | Ichikawa ............... H02J 7/0047 320/108 |
| 2013/0193749 A1* | 8/2013 | Nakamura ................ B60L 3/00 307/9.1 |
| 2014/0225441 A1* | 8/2014 | Mizuno ................... B60L 58/30 307/66 |
| 2015/0008877 A1 | 1/2015 | Ichikawa et al. |
| 2018/0222335 A1* | 8/2018 | Niwa ...................... B60L 53/12 |
| 2018/0236889 A1* | 8/2018 | Masuda ............. B60L 11/1838 |

FOREIGN PATENT DOCUMENTS

| | | |
|---|---|---|
| AU | 2010200044 A1 | 1/2010 |
| AU | 2006269374 C1 | 3/2010 |
| CA | 2615123 A1 | 1/2007 |
| CA | 2682284 A1 | 10/2008 |
| CN | 101258658 A | 9/2008 |
| CN | 101682216 A | 3/2010 |
| CN | 101860089 A | 10/2010 |
| EP | 1902505 A2 | 3/2008 |
| EP | 2130287 A1 | 12/2009 |
| IN | 735/DELNP/2008 | 5/2008 |
| IN | 6195/DELNP/2009 | 7/2010 |
| JP | 2009-501510 A | 1/2009 |
| JP | 2013-110822 A | 6/2013 |
| JP | 2013-126327 A | 6/2013 |
| JP | 2013-146148 A | 7/2013 |
| JP | 2013-146154 A | 7/2013 |
| JP | 2013154815 A | 8/2013 |
| JP | 2016-082799 A | 5/2016 |
| KR | 20080031398 A | 4/2008 |
| KR | 20100015954 A | 2/2010 |
| WO | 2007008646 A2 | 1/2007 |
| WO | 2008118178 A1 | 10/2008 |

* cited by examiner

VEHICLE AND POWER TRANSFER SYSTEM

CROSS-REFERENCE TO RELATED APPLICATIONS

This nonprovisional application claims priority Japanese Patent Application No. 2017-130122 filed on Jul. 3, 2017 with the Japan Patent Office, the entire contents of which are hereby incorporated by reference.

BACKGROUND

Field

The present disclosure relates to a technology for charging an on-vehicle power storage device using a power supply external to a vehicle.

Description of the Background Art

There has been a conventionally known technology for charging a vehicle-mounted battery using a wireless charging system that includes a power receiving device provided on a vehicle and includes a power transmitting device connected to a power supply external to the vehicle, the wireless charging system being configure to wirelessly transmit power from the power transmitting device to the power receiving device (see Japanese Patent Laying-Open No. 2013-154815, Japanese Patent Laying-Open No. 2013-146154, Japanese Patent Laying-Open No. 2013-146148, Japanese Patent Laying-Open No. 2013-110822, and Japanese Patent Laying-Open No. 2013-126327).

Further, Japanese Patent Laying-Open No. 2016-082799, for example, discloses a vehicle capable of externally charging a vehicle-mounted battery by both contact charging and wireless charging.

SUMMARY

When such a vehicle performs external charging using an AC power supply as an external power supply, for example, a sudden change in charging power may cause small fluctuation (flicker) in power supply voltage of the AC power supply. The occurrence of flicker may affect other electric installations that receive power supplied from the same AC power supply. Since contact charging and wireless charging are different from each other in the path of power reception from the external power supply, it is desired to reduce such fluctuation in power supply voltage both during contact charging and during wireless charging. Such a problem is not considered in the references listed above.

An object of the present disclosure is to provide a vehicle and a power transfer system that reduce fluctuation in power supply voltage during charging, for a vehicle capable of external charging including both contact charging and wireless charging.

A vehicle according to one aspect of the present disclosure includes: a power receiving device configured to receive power wirelessly from an external power supply outside the vehicle; a charging device configured to receive power from a connector of a charging cable to be connected to the external power supply; a power storage device configured to be charged with power supplied from any one of the power receiving device and the charging device; and a controller configured to control charging power to be supplied to the power storage device so as to satisfy requested power. The controller is configured to, during charging with the charging device, execute a slow change process for correcting the requested power so as to prevent a magnitude of change per predetermined time in the charging power from exceeding an upper limit. The controller is configured not to execute the slow change process during charging with the power receiving device.

In this way, during charging with the charging device, the slow change process corrects the requested power so as to prevent the magnitude of change per predetermined time in charging power from exceeding an upper limit, and thus abrupt fluctuation in charging power can be reduced. As a result, fluctuation in power supply voltage can be reduced.

In some embodiments, the vehicle further includes a communication device configured to communicate with a power transmitting device configured to wirelessly supply power from the external power supply to the power receiving device. The controller is configured to, during charging with the power receiving device, send the power transmitting device an instruction for execution of a process for preventing a magnitude of change per predetermined time in transmission power transmitted from the power transmitting device to the power receiving device from exceeding an upper limit.

In this way, during charging with the power receiving device, an instruction is sent to the power transmitting device for execution of a process for preventing a magnitude of change per predetermined time in transmission power from exceeding an upper limit. Thus, by the power transmitting device executing this process, abrupt fluctuation in charging power can be reduced. As a result, fluctuation in power supply voltage can be reduced.

A power transfer system according to another aspect of the present disclosure includes a vehicle and a charging station. The charging station includes: a first communication device; and at least any one of a power transmitting device to be connected to an external power supply and a connector of a charging cable to be connected to the external power supply. The vehicle includes: a second communication device configured to communicate with the first communication device; a power receiving device configured to receive power wirelessly from the power transmitting device; a charging device configured to receive power via the connector from the external power supply; a power storage device configured to be charged with power supplied from any one of the power receiving device and the charging device; and a second controller configured to control charging power to be supplied to the power storage device so as to satisfy requested power. The second controller is configured to, during charging with the charging device, execute a first slow change process for correcting the requested power so as to prevent a magnitude of change per predetermined time in the charging power from exceeding an upper limit. The second controller is configured to, during charging with the power receiving device, send the charging station an instruction for execution of a second slow change process for preventing a magnitude of change per predetermined time in transmission power transmitted from the power transmitting device to the power receiving device from exceeding an upper limit. In the power transmitting device, the second slow change process is executed in accordance with the instruction for execution.

In this way, during charging with the charging device, the first slow change process can reduce abrupt fluctuation in charging power. Further, during charging with the power receiving device, the second slow change process can reduce abrupt fluctuation in charging power. As a result, fluctuation in power supply voltage can be reduced.

The foregoing and other objects, features, aspects and advantages of the present disclosure will become more apparent from the following detailed description of the present disclosure when taken in conjunction with the accompanying drawings.

DESCRIPTION OF THE EMBODIMENTS

An embodiment of the present disclosure will now be described hereinafter in detail with reference to the drawings. In the figures, identical or corresponding components are identically denoted and will not be described repeatedly.

Figure 1:
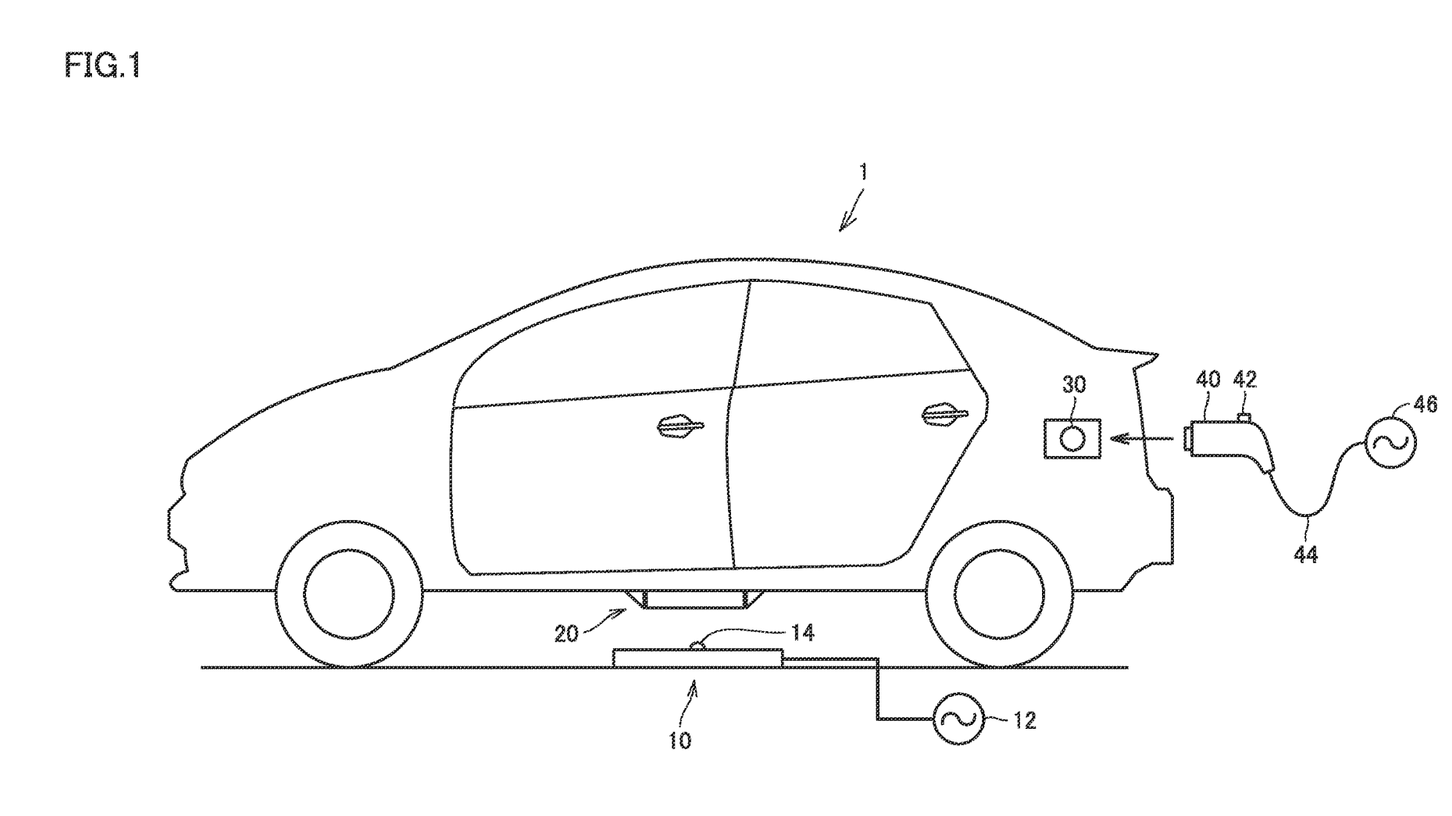
FIG. 1 generally shows a configuration of a power transfer system.

FIG. 1 generally shows a power transfer system according to the present embodiment. With reference to FIG. 1, the power transfer system includes a vehicle 1 and a charging station 2. Vehicle 1 includes a power receiving device 20. Power receiving device 20 is provided on the bottom surface (ground side) of vehicle 1. Charging station 2 includes a power transmitting device 10 to be connected to a power supply 12 (external power supply), and a connector 40 of a charging cable 44 to be connected to a power supply 46 (external power supply).

Power transmitting device 10 receives power supplied from power supply 12 (for example, an alternate current (AC) power supply, such as a commercial grid power supply). Power transmitting device 10 is installed on the ground and is configured to wirelessly transmit power to power receiving device 20 of vehicle 1 via a magnetic field while vehicle 1 is positioned in such a way that power receiving device 20 faces power transmitting device 10.

Power transmitting device 10 includes a camera 14. Camera 14 is equipped with a fisheye lens and is provided, for example, substantially at the center of the upper surface of power transmitting device 10. Camera 14 provided with the fisheye lens is capable of capturing a large space including power receiving device 20 when vehicle 1 moves toward power transmitting device 10. Using an image captured by camera 14, a positional relationship of power receiving device 20 relative to power transmitting device 10 can be detected and power receiving device 20 can be aligned with power transmitting device 10.

Specifically, when vehicle 1 moves toward power transmitting device 10, an image of the surroundings of camera 14 is captured by camera 14, and the image data is sent to vehicle 1. The lower surface (the surface to face power transmitting device 10) of power receiving device 20 is provided with a mark, with which camera 14 is to detect the position of power receiving device 20.

Vehicle 1 further includes a charging inlet 30. Charging inlet 30 is configured to connect to connector 40 of charging cable 44 that is connected to power supply 46 (or power supply 12) external to the vehicle. That is, this vehicle 1 is not only capable of wirelessly receiving power from power transmitting device 10 through power receiving device 20 so as to charge an on-vehicle power storage device (see FIG. 2), but also capable of receiving power from power supply 46 external to the vehicle through charging cable 44 and charging inlet 30 so as to charge the power storage device. Hereinafter the former is referred to as "wireless charging", and the latter is referred to as "contact charging". Also, both wireless charging and contact charging are for charging a power storage device 300 using a power supply external to the vehicle, and thus they may be hereinafter collectively referred to as "external charging".

Charging inlet 30 and connector 40 have a mechanical locking mechanism (not shown) so that connector 40 will not easily come out of charging inlet 30 when charging inlet 30 and connector 40 are in connection. Connector 40 is provided with a switch 42 to release the mechanical locking state between charging inlet 30 and connector 40, so that a user can remove connector 40 from charging inlet 30 by operating switch 42.

Figure 2:
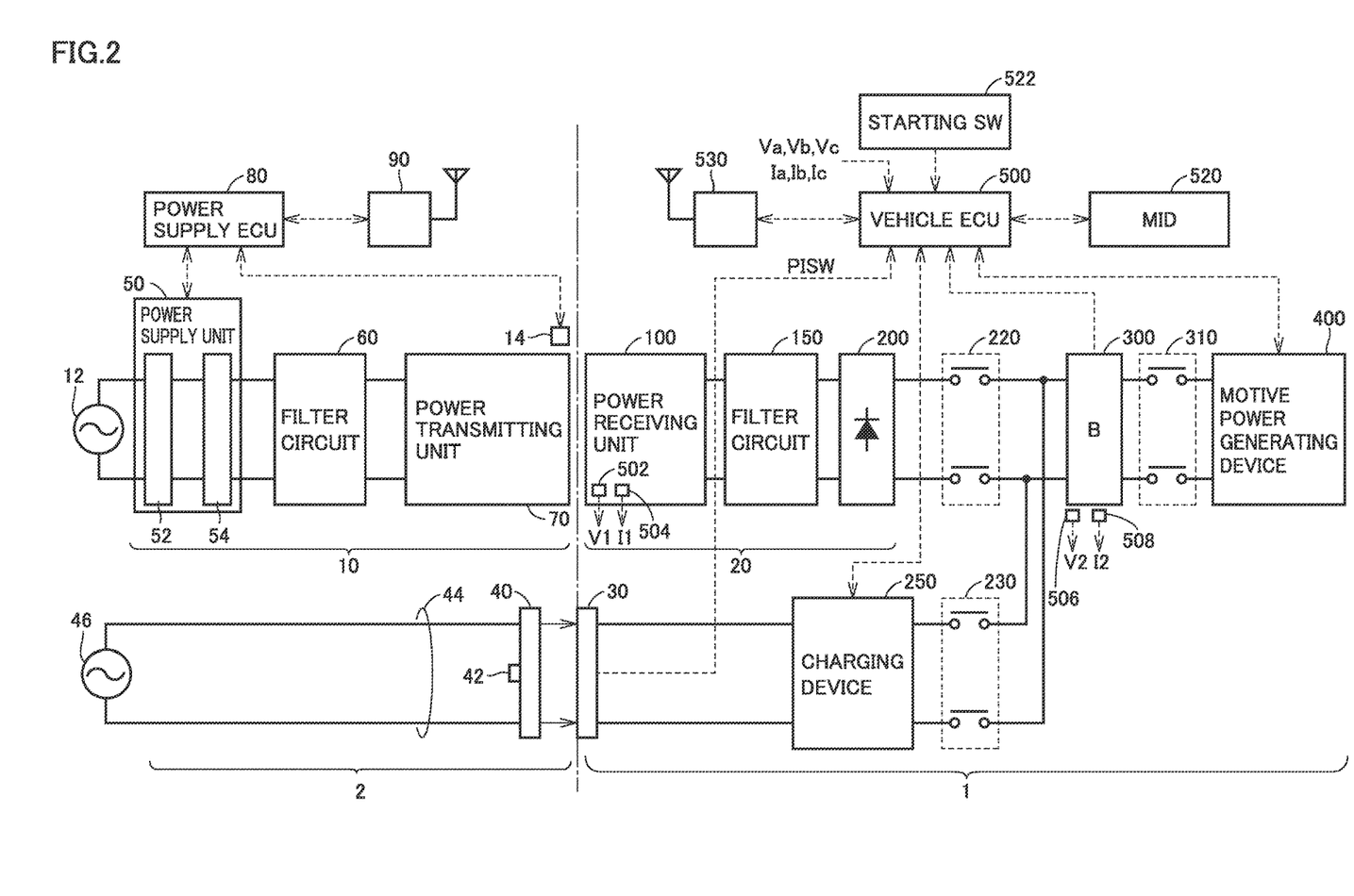
FIG. 2 is a block diagram of the power transfer system shown in FIG. 1.

FIG. 2 is a block diagram of the power transfer system shown in FIG. 1. With reference to FIG. 2, vehicle 1 includes power receiving device 20, power storage device 300, a motive power generating device 400, and relays 220, 310. Vehicle 1 also includes charging inlet 30, a charging device 250, and a relay 230. Further, vehicle 1 also includes a vehicle electronic control unit (ECU) 500, a multi information display (MID) 520, a starting switch 522, and a communication device 530.

Power receiving device 20 includes a power receiving unit 100, a filter circuit 150, and a rectifier circuit 200. Power receiving unit 100 is configured to wirelessly receive power (alternating current) output from a power transmitting unit 70 (described later) of power transmitting device 10 via a magnetic field with no contact point. Power receiving unit 100 includes, for example, a resonance circuit (not shown) for wirelessly receiving power from power transmitting unit 70. The resonance circuit may be constituted of a coil and a capacitor as described later (see FIG. 3). If desired resonant conditions can be formed with a coil alone, however, a capacitor does not necessarily have to be included.

Power receiving unit 100 is provided with a first voltage sensor 502 and a first current sensor 504. First voltage sensor 502 detects an output voltage V1 of the power receiving coil and sends a signal representing detected output voltage V1 to vehicle ECU 500. First current sensor 504 detects a current I1 flowing at the power receiving coil and sends a signal representing detected current I1 to vehicle ECU 500.

Filter circuit 150 is provided between power receiving unit 100 and rectifier circuit 200 to reduce harmonic noise to be generated when power receiving unit 100 receives power. Filter circuit 150 is constituted of an LC circuit including an inductor and a capacitor, for example. Rectifier circuit 200 rectifies AC power received by power receiving unit 100 and outputs it to power storage device 300. Rectifier circuit 200 includes a rectifier together with a smoothing capacitor.

Power storage device 300 is a rechargeable DC power supply and includes a secondary battery, such as a lithium-ion battery and a nickel-hydride battery. Power storage device 300 can store not only power output from rectifier circuit 200 during execution of wireless charging, but also power output from charging device 250 (described later) during execution of contact charging and power generated by motive power generating device 400 during travelling, for example. Further, power storage device 300 supplies the stored power to motive power generating device 400. As power storage device 300, an electric double layer capacitor may be used, for example.

Power storage device 300 is provided with a second voltage sensor 506 and a second current sensor 508. Second voltage sensor 506 detects a voltage V2 between terminals of power storage device 300 and sends a signal representing detected voltage V2 to vehicle ECU 500. Second current sensor 508 detects a current I2 flowing from power receiving device 20 or charging device 250 and sends a signal representing detected current I2 to vehicle ECU 500.

Motive power generating device 400 generates a driving force for travelling of vehicle 1 using power stored in power storage device 300. Although not shown, motive power generating device 400 includes, for example, an inverter for receiving power from power storage device 300, a motor to be driven by the inverter, a driving wheel to be driven by the motor. Motive power generating device 400 may also include a generator for generating power to charge power storage device 300, and an engine capable of driving the generator.

Relay 220 is provided between rectifier circuit 200 and power storage device 300. Relay 220 is ON (conduction state) during wireless charging. An SMR 310 is provided between power storage device 300 and motive power generating device 400. SMR 310 is turned on upon request for start-up of motive power generating device 400.

Charging inlet 30 is configured to connect to connector 40 of charging cable 44. During execution of contact charging, charging inlet 30 receives power from power supply 46 external to the vehicle through connector 40 and outputs the received power to charging device 250. Charging inlet 30 outputs, to vehicle ECU 500, a connector connection signal PISW representing the connection state with connector 40. Connector connection signal PISW is, for example, a signal that changes in electric potential depending on the status of connection between charging inlet 30 and connector 40. Specifically, connector connection signal PISW changes in electric potential depending on whether the status is a connection state, a non-connection state, or a connection state with switch 42 of connector 40 operated.

Charging device 250, which is controlled by vehicle ECU 500, converts power received through charging inlet 30 into power having a charging voltage of power storage device 300 and outputs the converted power to power storage device 300. Charging device 250 includes a converter, an inverter, an isolation transformer, and a rectifier circuit, for example. Relay 230 is provided between charging device 250 and power storage device 300. Relay 230 is ON (conduction state) during contact charging.

Starting switch 522 is a switch for receiving operations from a user for starting up and stopping the system of vehicle 1. For example, the vehicle system starts up in response to turning on of starting switch 522, and the vehicle system stops in response to turning off of starting switch 522. The status of vehicle 1 may be sequentially switched among stopping of the system, an accessory mode, starting-up of the system, and stopping of the system in this order each time starting switch 522 is pressed. Instead of starting switch 522, a switch that serves a similar function to starting switch 522 may also be used, such as an ignition switch and a power switch.

MID 520 is a display capable of displaying various pieces of information of vehicle 1 and receiving operational input from a user. MID 520 includes, for example, a liquid crystal display and an organic electro luminescence (EL) display that can receive touch input. Vehicle 1 according to the present embodiment is capable of executing timer charging in which external charging (wireless charging or contact charging) is performed in accordance with a time schedule, and MID 520 is configured so that a user can set the timer charging. Specifically, MID 520 is configured so that a user can input an expected time of departure of vehicle 1 and so that the timer charging is executed in accordance with the time schedule calculated based on the input expected time of departure. Further, MID 520 is configured so that a user can cancel the set timer charging.

Communication device 530 is configured to perform radio communication with a communication device 90 of power transmitting device 10. With communication device 90, communication device 530 exchanges information, such as a start/stop of power transmission and a power receiving status (e.g. power receiving voltage) of vehicle 1, during execution of an alignment between power transmitting unit 70 and power receiving unit 100 and during execution of wireless charging.

Vehicle ECU 500 includes a central processing unit (CPU), a memory (read only memory (ROM) and random access memory (RAM)), and an input/output port for inputting/outputting various signals, etc., none of which is shown, and executes predetermined arithmetic processing based on information stored in the memory and information from various sensors. Vehicle ECU 500 controls each device in vehicle 1 based on the results of the arithmetic processing.

For example, if wireless charging is to be performed, vehicle ECU 500 executes an alignment process of power receiving unit 100 relative to power transmitting unit 70 of power transmitting device 10 prior to execution of the wireless charging. The term "alignment" refers to an alignment of power receiving unit 100 relative to power transmitting unit 70 in the horizontal direction of the vehicle body. For example, vehicle ECU 500 receives an image taken by camera 14 of power transmitting device 10 through communication devices 90, 530 and controls motive power generating device 400 and a steering (not shown) so that vehicle 1 stops at the position where power receiving unit 100 faces power transmitting unit 70.

After the completion of the alignment process, vehicle ECU 500 executes a pairing process for associating vehicle 1 with power transmitting device 10. The term "pairing" refers to associating vehicle 1 and power transmitting device 10 with each other. If a plurality of parking spaces including their respective power transmitting devices are provided adjacent to each other, the pairing process is executed so that a vehicle parked in one parking space is associated with a power transmitting device in the parking space. Upon completion of the alignment process and the pairing process, vehicle ECU 500 turns on relay 220 to send an instruction for starting power transmission to power transmitting device 10 through communication device 530.

Power transmitting device 10 includes a power supply unit 50, a filter circuit 60, power transmitting unit 70, camera 14, a power supply ECU 80, and communication device 90. Power supply unit 50 receives power from power supply 12 and generates AC power having a predetermined transmission frequency. Power supply unit 50 includes, for example, a power factor correction (PFC) circuit 52 and an inverter 54 for converting DC power received from PFC circuit 52 into AC power having a predetermined transmission frequency (for example, a few tens of kHz).

Power transmitting unit 70 receives AC power having a transmission frequency from power supply unit 50, and wirelessly transmits the power to power receiving unit 100 of vehicle 1 via a magnetic field generated around power transmitting unit 70. Power transmitting unit 70 includes, for example, a resonance circuit (not shown) for wirelessly transmitting power to power receiving unit 100. The resonance circuit is constituted of a coil and a capacitor as described later (see FIG. 3). If desired resonant conditions can be formed with a coil alone, however, a capacitor does not necessarily have to be included.

Filter circuit 60 is provided between power supply unit 50 and power transmitting unit 70 to reduce harmonic noise to be generated from power supply unit 50. Filter circuit 60 is constituted of an LC circuit including an inductor and a capacitor, for example.

In this power transfer system, AC power having a predetermined transmission frequency is supplied from inverter 54 to power transmitting unit 70 through filter circuit 60 in power transmitting device 10. The resonance circuit of power transmitting unit 70 and the resonance circuit of power receiving unit 100 are designed to resonate at the transmission frequency.

When AC transmission power is supplied to power transmitting unit 70, energy (power) transfers from power transmitting unit 70 to power receiving unit 100 via a magnetic field formed between a power transmitting coil of power transmitting unit 70 and a power receiving coil of power receiving unit 100. The energy (power) that has transferred to power receiving unit 100 is supplied to power storage device 300 through filter circuit 150 and rectifier circuit 200.

Power supply ECU 80 includes a CPU, a memory (ROM and RAM), and an input/output port for inputting/outputting various signals, etc., none of which is shown, and executes predetermined arithmetic processing based on information stored in the memory and information from various sensors. Power supply ECU 80 controls each device in power transmitting device 10 based on the results of the arithmetic processing.

Communication device 90 is configured to perform radio communication with communication device 530 of vehicle 1. With communication device 530, communication device 90 exchanges information, such as a start/stop of power transmission and a power receiving status (e.g. power receiving voltage) of vehicle 1, during execution of an alignment and during execution of wireless charging.

For example, in response to the reception of an instruction for starting power transmission through communication device 90, power supply ECU 80 performs switching control for power supply unit 50 (inverter 54) so that power supply unit 50 generates AC power having a predetermined transmission frequency.

At this time, power supply ECU 80 controls power transmitting device 10 so that the magnitude of the transmission power from power transmitting device 10 will be a target value (hereinafter also referred to as target power) of transmission power. Specifically, power supply ECU 80 controls power transmitting device 10 so that the magnitude of the transmission power will be the target power by adjusting the duty of the switching operation of inverter 54.

If vehicle ECU 500 is to receive power from power transmitting device 10, vehicle ECU 500 sets target power for power transmitting device 10 so that the power received at power receiving device 20 will be a desired target. Vehicle ECU 500 sends the set target power to power transmitting device 10 through communication device 530.

Figure 3:
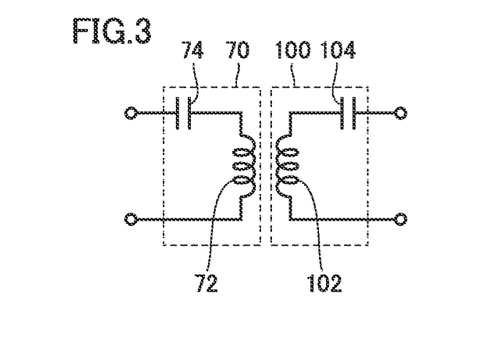
FIG. 3 shows one example of a circuit configuration of a power transmitting unit and a power receiving unit shown in FIG. 2.

FIG. 3 shows one example of a circuit configuration of power transmitting unit 70 and power receiving unit 100 shown in FIG. 2. With reference to FIG. 3, power transmitting unit 70 includes a coil 72 and a capacitor 74. Capacitor 74 is connected in series to coil 72 and forms a resonance circuit with coil 72. Capacitor 74 is provided in order to adjust the resonance frequency of power transmitting unit 70. In some embodiments, Q value representing the resonance intensity of the resonance circuit constituted of coil 72 and capacitor 74 is 100 or more.

Power receiving unit 100 includes a coil 102 and a capacitor 104. Capacitor 104 is connected in series to coil 102 and forms a resonance circuit with coil 102. Capacitor 104 is provided in order to adjust the resonance frequency of power receiving unit 100. In some embodiments, Q value of the resonance circuit constituted of coil 102 and capacitor 104 is 100 or more.

In power transmitting unit 70 and power receiving unit 100, capacitors 74 and 104 may be connected in parallel to coils 72 and 102, respectively. Although not shown, the structure of each coil 72, 102 is not particularly limited. For example, if power transmitting unit 70 and power receiving unit 100 face each other directly, a coil to be used as each coil 72, 102 may be the one having a spiral or helix shape that winds around the axis along the direction in which power transmitting unit 70 and power receiving unit 100 are arranged. Alternatively, if power transmitting unit 70 and power receiving unit 100 face each other directly, a coil to be used as each coil 72, 102 may be the one obtained by winding an electric wire around a ferrite plate, where the normal line direction aligns with the direction in which power transmitting unit 70 and power receiving unit 100 are arranged.

If contact charging is to be performed, on the other hand, vehicle ECU 500 turns on relay 230 and drives charging device 250 upon detecting the connection between connector 40 of charging cable 44 and charging inlet 30 based on connector connection signal PISW.

If contact charging is to be performed, vehicle ECU 500 controls the power (charging power) to be supplied to power storage device 300 from charging device 250 based on charging power requested by vehicle 1 (hereinafter referred to as requested power). For example, vehicle ECU 500 sets the sum of the following power as the requested power: the power obtained by dividing, by a charging time, an amount of charging power required to increase the state of charge (SOC) of power storage device 300, from the current SOC to the SOC corresponding to the full charge state (hereinafter referred to as a first power); the power required for charging an auxiliary battery (not shown) (hereinafter referred to as a second power); and the power required for operating auxiliaries during charging (hereinafter referred to as a third power). The charging time may be a predetermined period of time or may be a period of time from the present time to the time of completion of charging. If the sum of the first power, the second power, and the third power exceeds the power available from power supply 46, vehicle ECU 500 sets the power available from power supply 46 as the requested power.

When vehicle 1 described above performs external charging using an AC power supply as an external power supply, for example, a sudden change in charging power may cause small fluctuation (flicker) in power supply voltage of the AC power supply. The occurrence of flicker may affect other electric installations that receive power supplied from the same AC power supply. Since contact charging and wireless charging are different from each other in the path of power reception from the external power supply, it is desired to reduce such fluctuation in power supply voltage both during contact charging and during wireless charging.

In view of the above, in the present embodiment, during charging with charging device 250, vehicle ECU 500 executes a first slow change process for correcting requested power so as to prevent the magnitude of change per predetermined time in charging power from exceeding an upper limit; whereas during charging with power receiving device 20, vehicle ECU 500 does not execute the first slow change process.

In this way, during charging with charging device 250, the first slow change process corrects the requested power so as to prevent the magnitude of change per predetermined time in charging power from exceeding an upper limit, and thus abrupt fluctuation in charging power can be reduced. As a result, fluctuation in power supply voltage can be reduced.

Figure 4:
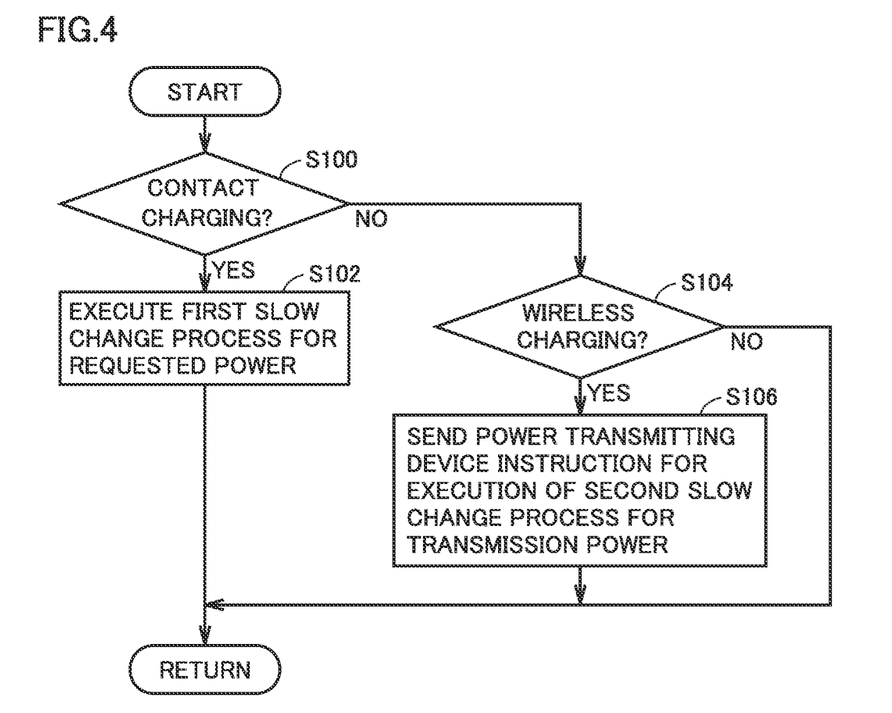
FIG. 4 is a flowchart showing a control process to be executed at a vehicle ECU.

With reference to FIG. 4, a control process to be executed at vehicle ECU 500 will now be described. FIG. 4 is a flowchart showing a control process to be executed at vehicle ECU 500. The process shown in this flowchart is invoked from a main routine (not shown) and executed for each predetermined control period. The steps included in the flowchart are basically implemented through software processing by vehicle ECU 500. The steps, however, may be partially or wholly implemented by hardware (electric circuit) within vehicle ECU 500.

At step (step is hereinafter referred to as "S") 100, vehicle ECU 500 determines whether or not contact charging is being performed. For example, vehicle ECU 500 determines that contact charging is being performed if a flag indicating that contact charging is being performed is in an on-state. For example, if power receiving device 20 is in a stopped state, vehicle ECU 500 may set the flag indicating that contact charging is being performed to the on-state in response to charging device 250 getting into an operation state upon establishment of the connection between connector 40 and charging inlet 30. If it is determined that contact charging is being performed (YES at S100), the process goes on to SI 102.

At S102, vehicle ECU 500 executes the first slow change process for requested power. The details of the first slow change process for requested power are described later.

On the other hand, if it is determined that contact charging is not being performed (NO at S100), vehicle ECU 500 determines whether or not wireless charging is being performed at S104. For example, vehicle ECU 500 determines that wireless charging is being performed if a flag indicating that wireless charging is being performed is in an on-state. For example, if the alignment process and the pairing process have completed without the connection of connector 40 to charging inlet 30, then vehicle ECU 500 may turn on relay 220, send an instruction for starting power transmission to power transmitting device 10 through communication device 530, and set the flag indicating that wireless charging is being performed to an on-state. If it is determined that wireless charging is being performed (YES at S104), the process goes on to S106.

At S106, vehicle ECU 500 sends power transmitting device 10 an instruction for execution of a second slow change process for transmission power. The details of the second slow change process for transmission power are described later. If it is determined that wireless charging is not being performed (NO at S104), this process ends.

Figure 5:
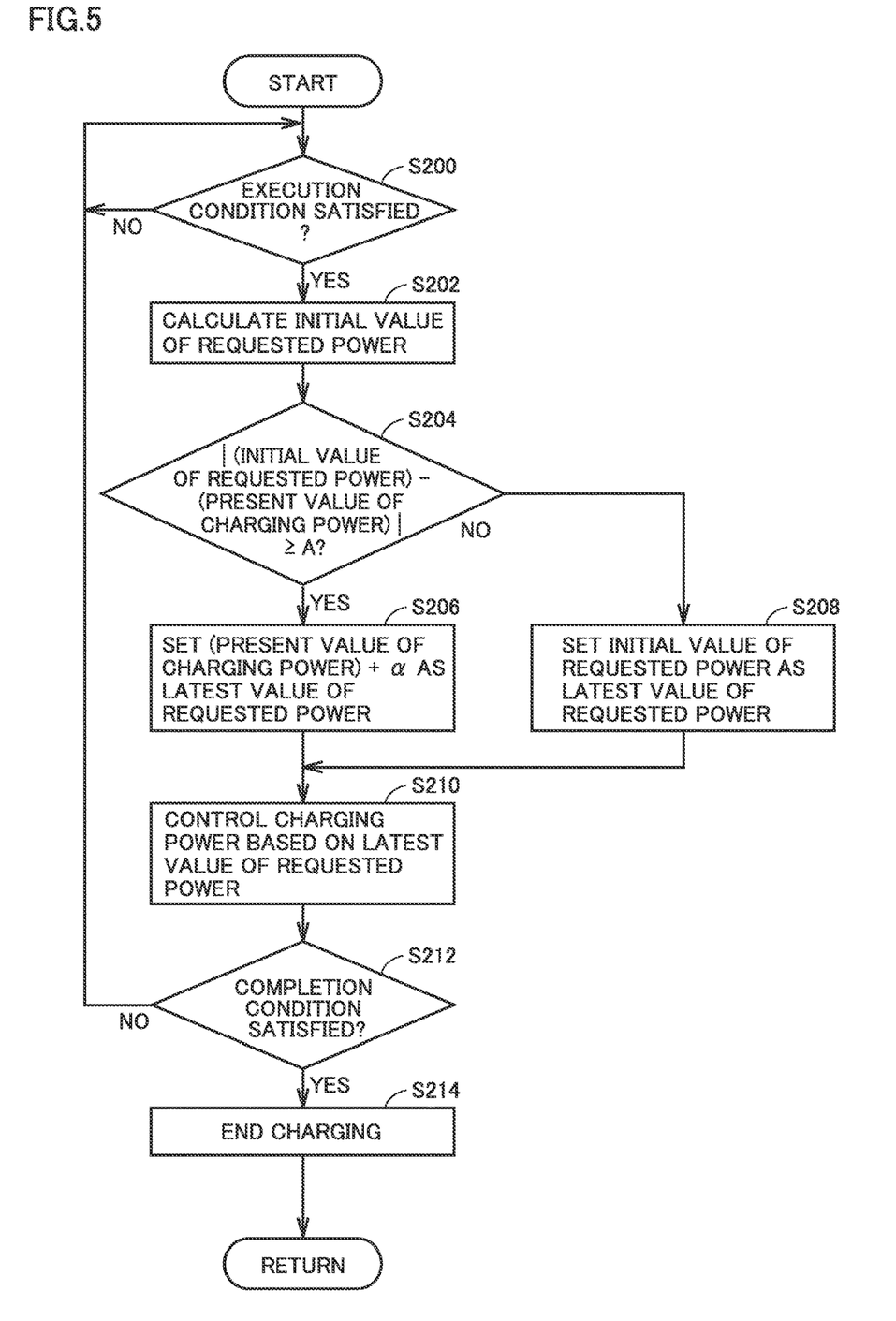
FIG. 5 is a flowchart showing a first slow change process to be executed at a vehicle ECU.

Next, with reference to FIG. 5, the first slow change process to be executed at vehicle ECU 500 is described. FIG. 5 is a flowchart showing the first slow change process to be executed at vehicle ECU 500.

At S200, vehicle ECU 500 determines whether or not an execution condition is satisfied. The execution condition includes the condition that it is the first time to set a latest value of the requested power or the condition that a predetermined period has elapsed since a latest value of the requested power was set last time. If it is determined that the execution condition is satisfied (YES at S200), the process goes on to S202.

At S202, vehicle ECU 500 calculates the initial value of the requested power. As described above, vehicle ECU 500 calculates each of the first power, the second power, and the third power, and determines their sum to be the initial value of the requested power. The detailed explanation on the method of calculating the first power, the second power, and the third power is not repeated. Further, as described above, if the sum of the first power, the second power, and the third power exceeds the power available from power supply 46, vehicle ECU 500 determines the power available from power supply 46 to be the initial value of the requested power.

At S204, vehicle ECU 500 determines whether or not the magnitude of the value (absolute value) obtained by subtracting the present value of the charging power from the initial value of the requested power is more than or equal to a threshold value A. Vehicle ECU 500 calculates the present value of the charging power by, for example, multiplying current I2 by voltage V2.

Threshold value A is set in such a way that the magnitude of change in charging power in a predetermined period will not be a magnitude that would cause a flicker in power supply 46. If it is determined that the magnitude of the value obtained by subtracting the present value of the charging power from the initial value of the requested power is more than or equal to threshold value A (YES at S204), the process goes on to S206.

At S206, vehicle ECU 500 sets the value obtained by adding a predetermined value $\alpha$ to the present value of the charging power, as the latest value of the requested power. During an increase in requested power (i.e., when the value obtained by subtracting the present value of the charging power from the initial value of the requested power is more than 0), vehicle ECU 500 sets the sign of predetermined value $\alpha$ as positive. During a decrease in requested power (i.e., when the value obtained by subtracting the present value of the charging power from the initial value of the requested power is less than 0), vehicle ECU 500 sets the sign of predetermined value $\alpha$ as negative.

On the other hand, if it is determined that the magnitude of the value obtained by subtracting the present value of the charging power from the initial value of the requested power is less than threshold value A (NO at S204), the process goes on to S208. At S208, vehicle ECU 500 sets the initial value of the requested power as the latest value of the requested power.

At S210, vehicle ECU 500 controls the charging power based on the set latest value of the requested power. Vehicle ECU 500 controls charging device 250 so that the charging power calculated with the voltage and the current of power storage device 300 will be the latest value of the requested power.

At S212, vehicle ECU 500 determines whether or not a completion condition is satisfied. The completion condition may include, for example, the condition that the SOC of power storage device 300 is within the range of SOC corresponding to the fill charge state, or may include the condition that the elapsed time from the start of charging is more than or equal to a threshold value. If it is determined that the completion condition is satisfied (YES at S212), the process goes on to S214. At S214, vehicle ECU 500 ends charging. At this time, vehicle ECU 500 sends information indicating the completion of charging to power supply ECU 80 through communication device 530.

If it is determined that the execution condition is not satisfied (NO at S200) or if it is determined that the completion condition is not satisfied (NO at S212), the process returns to S200.

Figure 6:
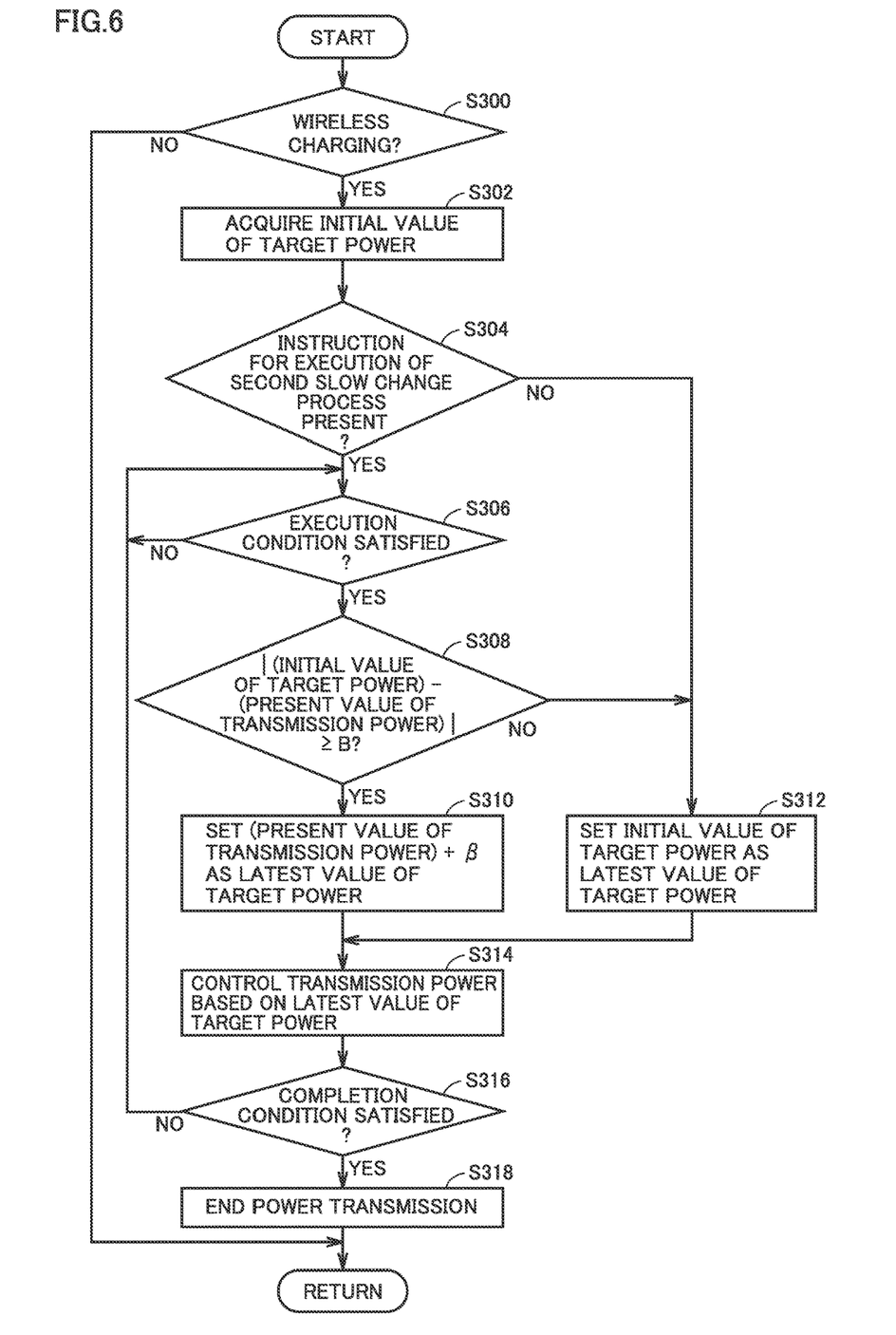
FIG. 6 is a flowchart showing a second slow change process to be executed at a power supply ECU.

Next, with reference to FIG. 6, the second slow change process for transmission power to be executed at power supply ECU 80 is described. FIG. 6 is a flowchart showing the second slow change process to be executed at power supply ECU 80. The process shown in this flowchart is invoked from a main routine (not shown) and executed for each predetermined control period. The steps included in the flowchart are basically implemented through software processing by power supply ECU 80. The steps, however, may be partially or wholly implemented by hardware (electric circuit) within power supply ECU 80.

At S300, power supply ECU 80 determines whether or not wireless charging is being performed. For example, power supply ECU 80 determines that wireless charging is being performed if power supply ECU 80 has received an instruction for starting power transmission through communication device 90 and has not received information indicating the completion of charging. If it is determined that wireless charging is being performed (YES at S300), the process goes on to S302.

At S302, power supply ECU 80 acquires target power. For example, power supply ECU 80 acquires target power together with an instruction for starting power transmission from vehicle ECU 500 through communication device 90. At S304, power supply ECU 80 determines whether or not an instruction for execution of the second slow change process is present. For example, power supply ECU 80 determines that an instruction for execution of the second slow change process is present if power supply ECU 80 has received an instruction for execution of the second slow change process from vehicle ECU 500 through communication device 90. If it is determined that an instruction for execution of the second slow change process is present (YES at S304), the process goes on to S306.

At S306, power supply ECU 80 determines whether or not an execution condition is satisfied. The execution condition includes, for example, the condition that it is the first time to set a latest value of the target power or the condition that a predetermined period has elapsed since a latest value of the target power was set last time. If it is determined that the execution condition is satisfied (YES at S306), the process goes on to S308.

At S308, power supply ECU 80 determines whether or not the value obtained by subtracting the present value of the transmission power from the target power is more than or equal to a threshold value B. Power supply ECU 80 may calculate the present value of the transmission power by multiply the voltage by the current in power transmitting unit 70, or may receive current I1 and voltage V1 from vehicle ECU 500 and estimate the present value of the transmission power based on the received current I1 and voltage V1.

Threshold value B is set in such a way that the magnitude of change in transmission power in a predetermined period will not be a magnitude that would cause a flicker in an electric installation connected to power supply 12. If it is determined that the magnitude of the value obtained by subtracting the present value of the transmission power from the initial value of the target power is more than or equal to threshold value B (YES at S308), the process goes on to S310.

At S310, power supply ECU 80 sets the value obtained by adding a predetermined value β to the present value of the transmission power, as the latest value of the target power. During an increase in transmission power (i.e., when the value obtained by subtracting the present value of the transmission power from the initial value of the target power is more than 0), power supply ECU 80 sets the sign of predetermined value β as positive. During a decrease in transmission power (i.e., when the value obtained by subtracting the present value of the transmission power from the initial value of the target power is less than 0), power supply ECU 80 sets the sign of predetermined value β as negative.

On the other hand, if it is determined that the magnitude of the value obtained by subtracting the present value of the transmission power from the initial value of the target power is less than threshold value B (NO at S308), the process goes on to S312. At S312, power supply ECU 80 sets the initial value of the target power as the latest value of the target power.

At S314, power supply ECU 80 controls the transmission power based on the set latest value of the target power. Power supply ECU 80 adjusts the duty of inverter 54 so that the transmission power will be the latest value of the target power.

At S316, power supply ECU 80 determines whether or not a completion condition is satisfied. The completion condition may include, for example, the condition that power supply ECU 80 has received information indicating the completion of charging from vehicle ECU 500 through communication device 90, or may include the condition that the elapsed time from the start of power transmission is more than or equal to a threshold value. If it is determined that the completion condition is satisfied (YES at S316), the process goes on to S318. At S318, power supply ECU 80 ends the power transmission.

If it is determined that wireless charging is not being performed (NO at S300), this process ends. If it is determined that an instruction for execution of the second slow change process is not present (NO at S304), the process goes on to S312. Further, if it is determined that the execution condition is not satisfied (NO at S306) or if it is determined that the completion condition is not satisfied (NO at S316), the process returns to S306.

Figure 7:
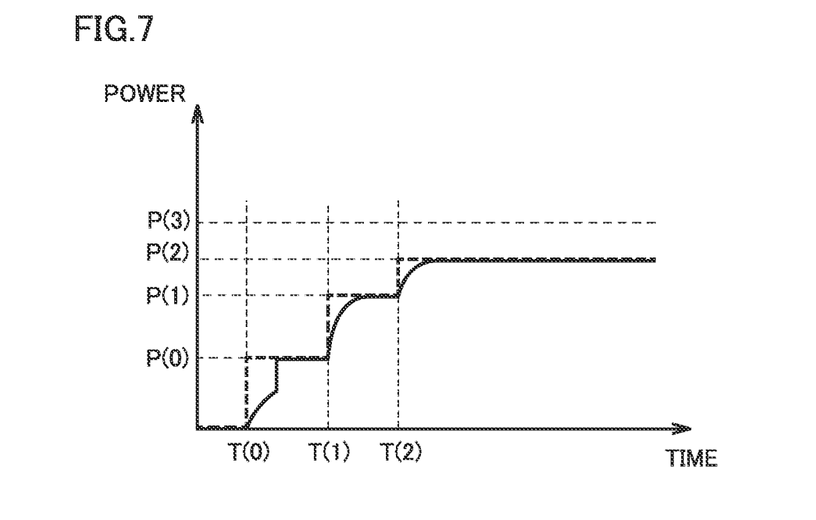
FIG. 7 is a timing chart for illustrating the operation of a vehicle ECU.

The operation of vehicle ECU 500 based on the structure and the flowchart as described above will now be described with reference to FIG. 7. FIG. 7 is a timing chart for illustrating the operation of vehicle ECU 500. The vertical axis in FIG. 7 represents power and the horizontal axis in FIG. 7 represents time. The solid line in FIG. 7 represents a change in charging power, and the thick broken line in FIG. 7 represents a change in latest value of the requested power.

For example, a case is assumed where contact charging starts in response to connector 40 being connected by a user. When a user connects connector 40 to charging inlet 30, vehicle ECU 500 sets the contact charging flag to an on-state and starts contact charging. If it is determined that contact charging is being performed by the on-state contact charging flag (YES at S100), the first slow change process for requested power is executed (S102).

For example, if it is determined that the execution condition is satisfied at time T(0) (YES at S200), the initial value of the requested power is calculated. For example, P(2) is determined as requested charging power.

If the present value of the charging power is zero, the magnitude of the value of (initial value P(2) of requested power)−(present value (zero) of charging power) is more than or equal to threshold value A (YES at S204) and, as indicated by the thick broken line in FIG. 7, (present value (zero) of charging power)+(predetermined value α) (=P(0)) is set as the latest value of the requested power (S206). Accordingly, as indicated by the solid line in FIG. 7, the charging power of charging device 250 is controlled to be the latest value P(0) of the requested power (S210).

If it is determined that the completion condition is not satisfied (NO at S212), it is determined whether or not the execution condition is satisfied again (S200).

If it is determined that the execution condition is satisfied again at time T(1) after a lapse of a predetermined period from time T(0) (YES at S200), the initial value of the requested power is calculated again. At this time, it is assumed that P(2) is again determined as the initial value of the requested power. Since the present value of the charging power is P(0), it is determined whether or not (initial value P(2) of requested power)−(present value P(0) of charging power) is more than or equal to threshold value A (S204).

If the magnitude of the value of P(2)−P(0) is more than or equal to threshold value A (YES at S204), as indicated by the thick broken line in FIG. 7, (present value P(0) of charging power)+(predetermined value α) (=P(1)) is set as the latest value of the requested power (S206). Accordingly, as indicated by the solid line in FIG. 7, the charging power of charging device 250 is controlled to be the latest value P(1) of the requested power (S210).

Further, if it is determined that the completion condition is not satisfied (NO at S212), it is determined whether or not the execution condition is satisfied again (S200).

If it is determined that the execution condition is satisfied again at time T(2) after a lapse of a predetermined period from time T(1) (YES at S200), the initial value of the requested power is calculated again. At this time, it is assumed that P(2) is again determined as the initial value of the requested power. Since the present value of the charging power is P(1), it is determined whether or not (initial value P(2) of requested power)−(present value P(1) of charging power) is more than or equal to threshold value A (S204).

If the magnitude of the value of P(2)−P(1) is less than threshold value A (NO at S204), as indicate by the thick broken line in FIG. 7, the initial value P(2) of the requested power is set as the latest value of the requested power (S208). Thus, as indicated by the solid line in FIG. 7, the charging power of charging device 250 is controlled to be the latest value P(2) of the requested power (S210).

FIG. 7 illustrates a case, as one example, where the latest value of the requested power increases stepwise if the requested power is higher than the present value of the charging power by greater than or equal to a certain value. If the requested power is less than the present value of the charging power by greater than or equal to a certain value, the latest value of the requested power decreases stepwise.

After that, if it is determined that the completion condition is satisfied (YES at S212), the charging ends (S214).

Next, it is assumed that wireless charging is started in response to a movement of vehicle 1 to a parking space provided with charging station 2. When vehicle 1 approaches the parking space and allows communications between communication devices 90 and 530, vehicle ECU 500 executes the alignment process and the pairing process. Upon completion of the alignment process and the pairing process, vehicle ECU 500 sends an instruction for starting power transmission to communication device 90 and sets the flag indicating that wireless charging is being performed to an on-state. By the on-state wireless charging flag, it is determined that wireless charging is being performed (YES at S104), and vehicle ECU 500 sends power transmitting device 10 an instruction for execution of the second slow change process for transmission power (S106).

During wireless charging (YES at S300), if the initial value of the target power is acquired (S302), power supply ECU 80 determines whether or not an instruction for execution of the second slow change process is present (S304).

If it is determined that an instruction for execution of the second slow change process is present (YES at S304) and that the execution condition is satisfied (YES at S306), then it is determined whether or not the magnitude of (initial value of target power)−(present value of transmission power) is more than or equal to threshold value B (S308).

If it is determined that the magnitude of (initial value of target power)−(present value of transmission power) is more than or equal to threshold value B (YES at S308), (present value of transmission power)+(predetermined value β) is set as the latest value of the target power (S310). Thus, the transmission power of power transmitting device 10 is controlled to be the latest value of the target power (S314).

On the other hand, if it is determined that the magnitude of (initial value of target power)−(present value of transmission power) is less than threshold value B (NO at S308), the initial value of the target power is set as the latest value of the target power (S312). Thus, the transmission power of power transmitting device 10 is controlled to be the initial value of the target power (S314).

If it is determined that the completion condition is satisfied (YES at S316), the power transmission ends (S318).

As described above, according to a vehicle of the present embodiment, during charging with charging device 250, the first slow change process corrects the requested power so as to prevent the magnitude of change per predetermined time in charging power from exceeding an upper limit, and thus abrupt fluctuation in charging power can be reduced. On the other hand, during charging with power receiving device 20, the second slow change process controls transmission power so as to prevent the magnitude of change per predetermined time in transmission power from exceeding an upper limit, and thus abrupt fluctuation in charging power can be reduced. As a result, fluctuation in power supply voltage can be reduced. Therefore, a vehicle and a power transfer system can be provided that reduce fluctuation in power supply voltage during charging, for a vehicle capable of external charging including both contact charging and wireless charging.

Variations will now be described hereinafter.

For convenience of explanation, the above embodiment describes a case where charging station 2 is provided with power transmitting device 10 and connector 40, so as to be capable of performing both contact charging and wireless charging. However, charging station 2 may be provided with at least any one of power transmitting device 10 and connector 40. That is, charging station 2 may be capable of performing at least any one of contact charging and wireless charging.

Further, although the above embodiment describes a case where vehicle 1 is provided with power storage device 300, vehicle 1 may be an electric vehicle that drives an electric motor as a driving source using electric power from power storage device 300, or may be a hybrid vehicle equipped with an additional engine as a power source.

Further the above embodiment describes a case where S204 in the flowchart of FIG. 5 performs a process of determining whether or not the magnitude of the difference between the initial value of the requested power and the present value of the charging power is more than or equal to threshold value A. Instead of such a process, however, a process of determining whether or not the magnitude of the difference between the initial value of the requested power and the previous value of the requested power is more than or equal to threshold value A may be performed, for example.

Further, the above embodiment describes a case where vehicle ECU 500 executes the first slow change process if contact charging is being performed and where vehicle ECU 500 sends an instruction for execution of the second slow change process to charging station 2 if wireless charging is being performed. During execution of protection control, however, the first slow change process may be non-executable, and/or an instruction for execution of the second slow change process may be prohibited from being sent to charging station 2, whether during contact charging or wireless charging. The protection control refers to the control for protecting the parts related to charging of power storage device 300 from being overheated, for example. Specifically, it refers to the control for limiting charging power to less than or equal to a threshold value if power storage device 300 is in an overcharging state, in an overcurrent state, or in a high temperature state. For example, vehicle ECU 500 may determine power storage device 300 to be in an overcharging state if the SOC of power storage device 300 is more than a threshold value, or may determine it to be an overcurrent state if current I2 is higher than a threshold value, or may determine it to be in a high temperature state if at least any one of the temperatures of power transmitting device 10, power receiving device 20, and power storage device 300 is higher than a threshold value. If the presence of any of these states is determined, vehicle ECU 500 executes the control for limiting charging power to less than or equal to a threshold value and also sets a protection control flag to an on-state.

Figure 8:
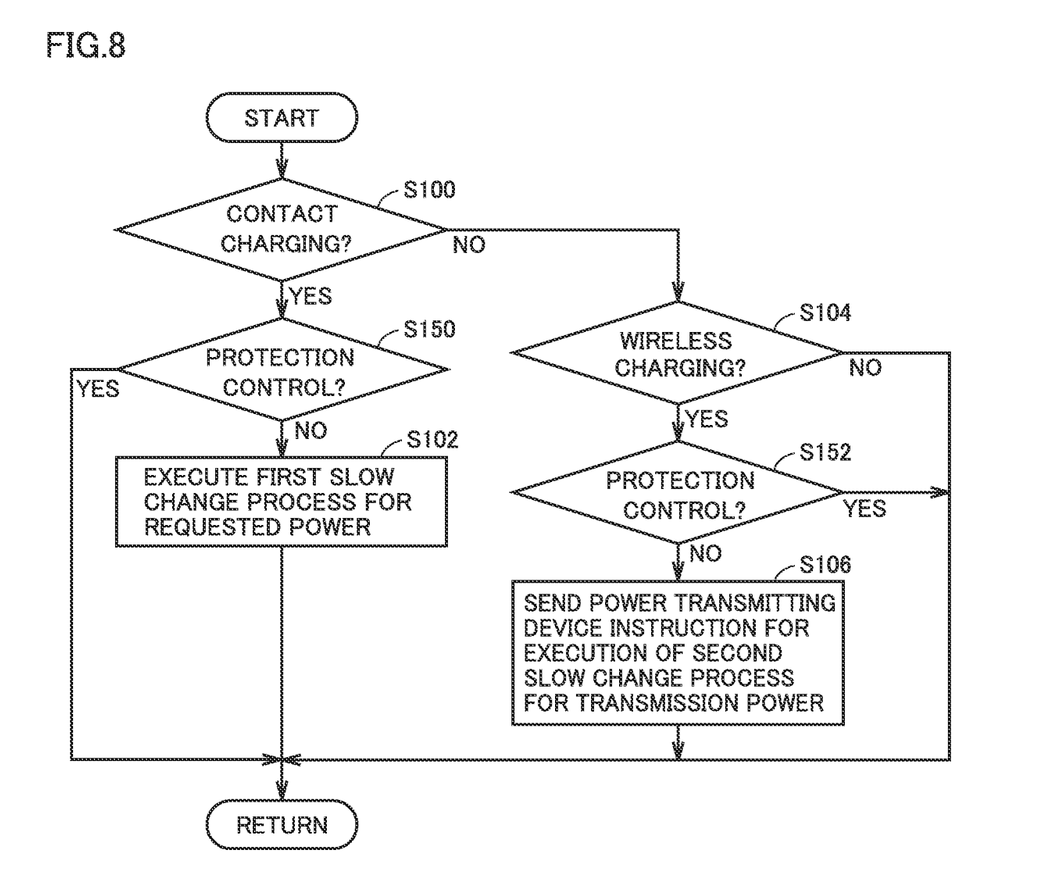
FIG. 8 is a flowchart (Part 1) showing a control process to be executed at a vehicle ECU according to a variation.

A control process to be executed at vehicle ECU 500 in this variation is described below with reference to FIG. 8. FIG. 8 is a flowchart (Part 1) showing a control process to be executed at vehicle ECU 500 according to the variation. The processes in S100, S102, S104, and S106 in the flowchart shown in FIG. 8 are similar to the processes of S100, S102, S104, and S106 in the flowchart shown in FIG. 4, and the detailed explanation of the steps is not repeated.

If it is determined that contact charging is being performed (YES at S100), vehicle ECU 500 determines whether or not the protection control is being performed at S150. For example, vehicle ECU 500 determines that the protection control is being performed if the protection control flag is in an on-state. If it is determined that the protection control is being performed (YES at S150), this process ends. On the other hand, if it is determined that protection control is not being performed (NO at S150), the process goes on to S102.

If it is determined that wireless charging is being performed (YES at S104), vehicle ECU 500 determines whether or not the protection control is being performed at S152. For example, vehicle ECU 500 determines that the protection control is being performed if the protection control flag is in an on-state. If it is determined that the protection control is being performed (YES at S152), this process ends. On the other hand, if it is determined that the protection control is not being performed (NO at S152), the process goes on to S106.

In this way, if the protection control is being performed, the protection control takes priority at the time of both contact charging and wireless charging. Therefore, the parts related to charging are protected. Note that, this variation describes a case where the protection control takes priority at the time of both contact charging and wireless charging. However, the protection control may take priority only at the time of contact charging or only at the time of wireless charging, for example.

Further, the above embodiment describes a case where vehicle ECU 500 executes the first slow change process if contact charging is being performed and where vehicle ECU 500 sends an instruction for execution of the second slow change process to charging station 2 if wireless charging is being performed. However, if wireless charging is being performed, in particular, whether to transmit an instruction for execution of the second slow change process may be determined based on control performed during the wireless charging. The control performed during the wireless charging includes protection control and searching control. The protection control is as described above, and the detailed explanation thereof is not repeated. At the time of execution of the protection control, vehicle ECU 500 sets a protection control flag to an on-state; and at the time of execution of the searching control, vehicle ECU 500 sets a searching control flag to an on-state, for example.

The searching control refers, for example, to the control for searching for an extreme value to be performed by power transmitting device 10. Specifically, it refers to the control for searching for a frequency that minimizes the current of the power transmitting coil by moving the frequency of transmission power to be generated by inverter 54. When the control for searching for an extreme value that minimizes the current of the power transmitting coil is executed, the transmission power is controlled to be decreased.

Figure 9:
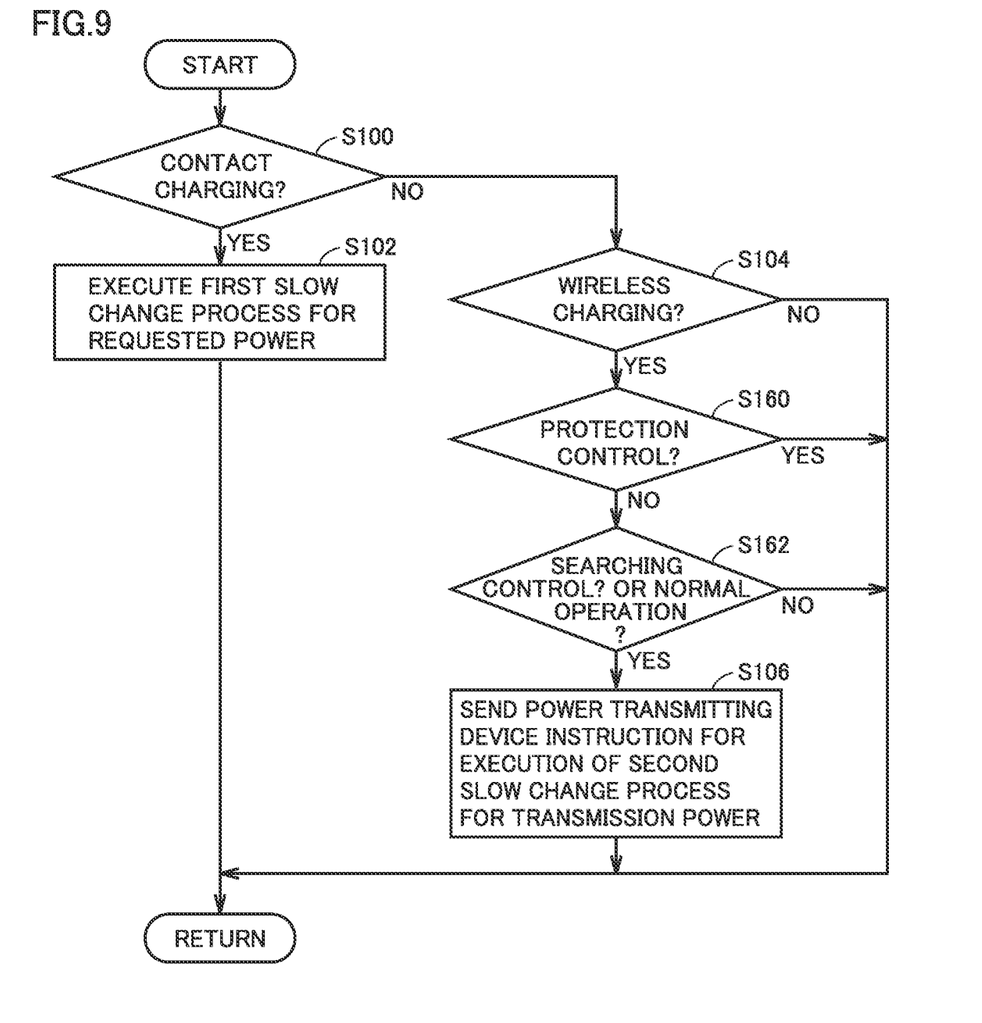
FIG. 9 is a flowchart (Part 2) showing a control process to be executed at a vehicle ECU according to a variation.

A control process to be executed at vehicle ECU 500 in this variation is described below with reference to FIG. 9. FIG. 9 is a flowchart (Part 2) showing a control process to be executed at vehicle ECU 500 according to the variation. The processes in S100, S102, S104, and S106 in the flowchart shown in FIG. 9 are similar to the processes of S100, S102, S104, and S106 in the flowchart shown in FIG. 4, and the detailed explanation of the steps is not repeated.

If it is determined that wireless charging is being performed (YES at S104), vehicle ECU 500 determines whether or not the protection control is being performed at S160. For example, vehicle ECU 500 determines that the protection control is being performed if the protection control flag is in an on-state. If it is determined that the protection control is being performed (YES at S160), this process ends. On the other hand, if it is determined that the protection control is not being performed (NO at S160), the process goes on to S162.

At S162, vehicle ECU 500 determines whether the searching control is being performed or a normal operation is being performed. For example, vehicle ECU 500 determines that the searching control is being performed if the searching control flag is in an on-state. For example, vehicle ECU 500 determines that the normal operation is being performed if the protection control flag is in an off-state and the searching control flag is in an off-state. If it is determined that the searching control is being performed or the normal operation is being performed (YES at S162), the process goes on to S106. If none of the searching control and the normal operation is being performed (NO at S162), this process ends.

In this way, an instruction for execution of the second slow change process is sent in response to a change in transmission power during execution of specific control, such as the searching control. Therefore, abrupt fluctuation in charging power can be reduced.

Note that the above-described variations may be combined in whole or in part.

Although embodiments of the present disclosure have been described, it should be construed that the embodiments disclosed herein are by way of illustration in every respect and are not to be taken by way of limitation. The scope of the present disclosure is defined by the terms of the claims and is intended to encompass any modification within the meaning and scope equivalent to the terms of the claims.

What is claimed is:

1. A vehicle comprising:
   a power receiving device configured to receive power wirelessly from an external power supply outside the vehicle;
   a charging device configured to receive power from a connector of a charging cable to be connected to the external power supply;
   a power storage device configured to be charged with power supplied from any one of the power receiving device and the charging device; and
   a controller configured to control charging power to be supplied to the power storage device so as to satisfy requested power,
   the controller being configured to, during charging with the charging device, execute a slow change process for correcting the requested power so as to prevent a magnitude of change per predetermined time in the charging power from exceeding an upper limit,
   the controller being configured not to execute the slow change process during charging with the power receiving device.

2. The vehicle according to claim 1, further comprising a communication device configured to communicate with a power transmitting device configured to wirelessly supply power from the external power supply to the power receiving device, wherein
   the controller is configured to, during charging with the power receiving device, send the power transmitting device an instruction for execution of a process for preventing a magnitude of change per predetermined time in transmission power transmitted from the power transmitting device to the power receiving device from exceeding an upper limit.

3. A power transfer system comprising:
   a vehicle; and
   a charging station,
   the charging station comprising:
      a first communication device; and
      at least any one of a power transmitting device to be connected to an external power supply and a connector of a charging cable to be connected to the external power supply,
   the vehicle comprising:
      a second communication device configured to communicate with the first communication device;
      a power receiving device configured to receive power wirelessly from the power transmitting device;
      a charging device configured to receive power via the connector from the external power supply;
      a power storage device configured to be charged with power supplied from any one of the power receiving device and the charging device; and
      a controller configured to control charging power to be supplied to the power storage device so as to satisfy requested power,
   the controller being configured to:
      during charging with the charging device, execute a first slow change process for correcting the requested power so as to prevent a magnitude of change per predetermined time in the charging power from exceeding an upper limit, and
      during charging with the power receiving device, send the charging station an instruction for execution of a second slow change process for preventing a magnitude of change per predetermined time in transmission power transmitted from the power transmitting device to the power receiving device from exceeding an upper limit,
   in the power transmitting device, the second slow change process being executed in accordance with the instruction for execution.

* * * * *

UNITED STATES PATENT AND TRADEMARK OFFICE
CERTIFICATE OF CORRECTION

PATENT NO. : 10,658,865 B2
APPLICATION NO. : 16/020442
DATED : May 19, 2020
INVENTOR(S) : Takahiro Misawa It is certified that error appears in the above-identified patent and that said Letters Patent is hereby corrected as shown below:

On the Title Page

Item (72), inventors, address, delete "Okazaki" and insert --Okazaki-shi Aichi-ken--, therefor.

In the Specification

In Column 11, Line(s) 2, delete "fill" and insert --full--, therefor.

Signed and Sealed this
Fourth Day of August, 2020

Andrei Iancu
*Director of the United States Patent and Trademark Office*